United States Patent
McDaniel

(10) Patent No.: US 7,114,005 B2
(45) Date of Patent: Sep. 26, 2006

(54) ADDRESS HOPPING OF PACKET-BASED COMMUNICATIONS

(75) Inventor: David W. McDaniel, Dallas, TX (US)

(73) Assignee: Cisco Technology, Inc., San Jose, CA (US)

(*) Notice: Subject to any disclaimer, the term of this patent is extended or adjusted under 35 U.S.C. 154(b) by 621 days.

(21) Appl. No.: 10/072,069

(22) Filed: Feb. 5, 2002

(65) Prior Publication Data

US 2003/0149783 A1    Aug. 7, 2003

(51) Int. Cl.
G06F 15/16    (2006.01)
H04M 1/66    (2006.01)

(52) U.S. Cl. .................................. 709/245
(58) Field of Classification Search ............... 709/238, 709/239, 244, 245; 713/201
See application file for complete search history.

(56) References Cited

U.S. PATENT DOCUMENTS

| | | | | |
|---|---|---|---|---|
| 6,523,068 B1* | 2/2003 | Beser et al. | ............... | 709/238 |
| 2002/0091941 A1* | 7/2002 | Challener et al. | ........... | 713/201 |
| 2003/0069981 A1* | 4/2003 | Trovato | ...................... | 709/228 |
| 2004/0003116 A1* | 1/2004 | Munger et al. | ............. | 709/245 |
| 2004/0103205 A1* | 5/2004 | Larson et al. | ............... | 709/229 |

FOREIGN PATENT DOCUMENTS

| | | | |
|---|---|---|---|
| WO | WO 00/70458 | | 11/2000 |
| WO | WO 0070458 | * | 11/2000 |
| WO | WO 01/61922 A2 | | 8/2001 |
| WO | WO 01/97461 A1 | | 12/2001 |
| WO | WO 01/97485 A2 | | 12/2001 |
| WO | WO 03/032603 A2 | | 4/2003 |

OTHER PUBLICATIONS

Notification of Transmittal of the International Search Report or the Declaration (PCT Rule 44.1) mailed Jul. 4, 2003 (6 pages) re International Application No. PCT/US 03/03289.
EPO Office Action pursuant to Article 96(2) EPC regarding Application No./Patent No. 03710838.8-1525 (3 pages).

* cited by examiner

Primary Examiner—Zarni Maung
Assistant Examiner—Ashok Patel
(74) Attorney, Agent, or Firm—Baker Botts L.L.P.

(57) ABSTRACT

A communication system includes translation modules that provide address hopping to secure packet-based communications. A transmitting translation module modifies source and/or destination addresses of communicated packets and a receiving translation module resolves each modified source and/or destination address into the original source and destination addresses for the packets.

27 Claims, 2 Drawing Sheets

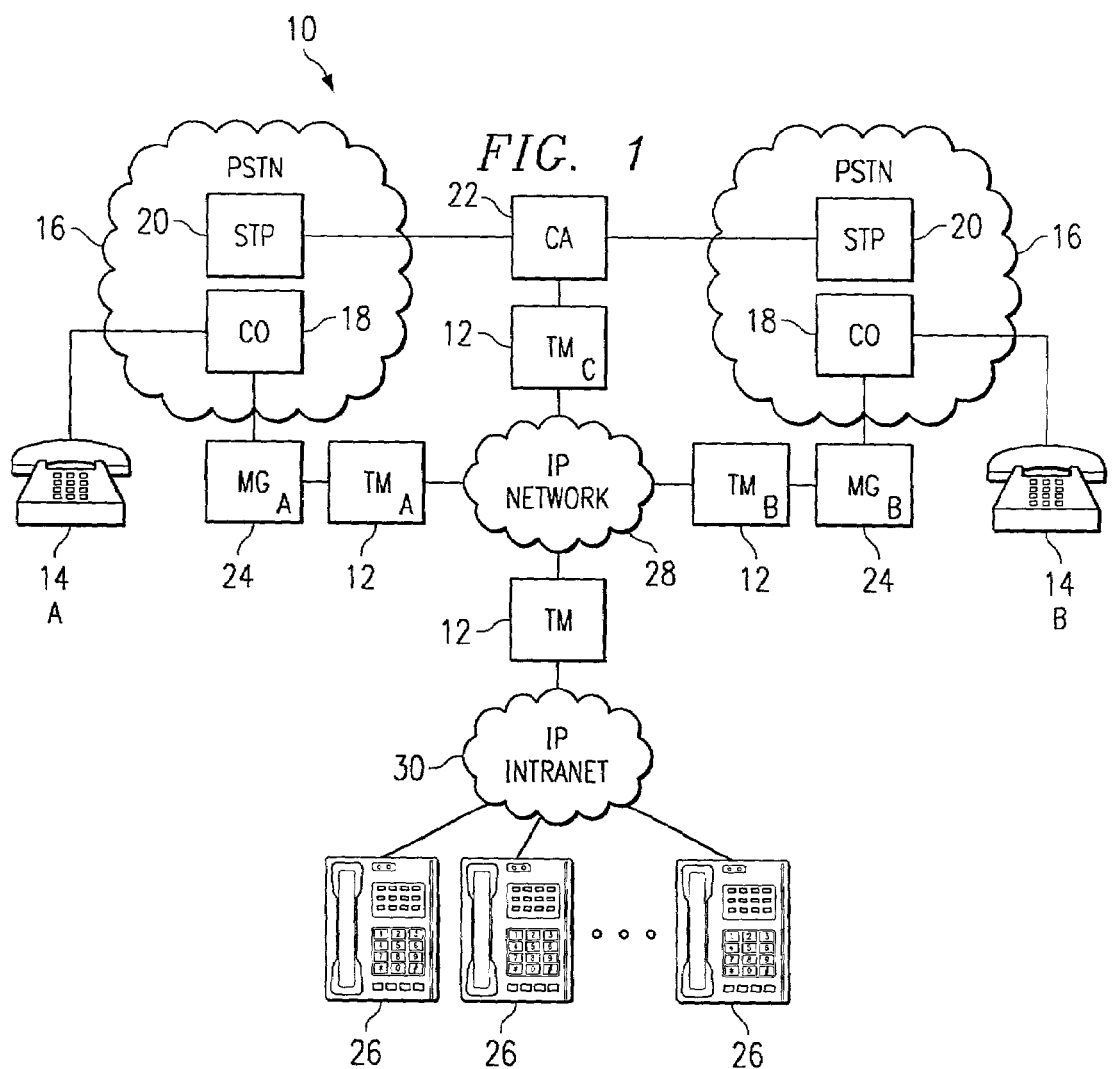
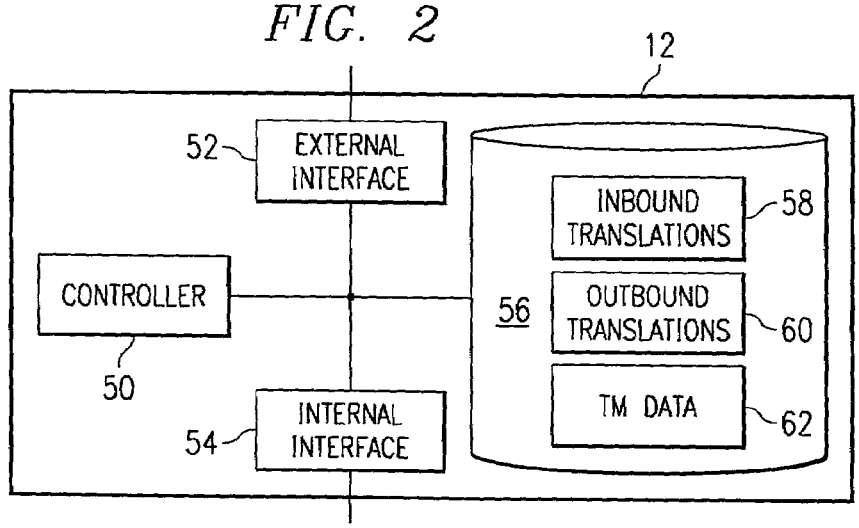

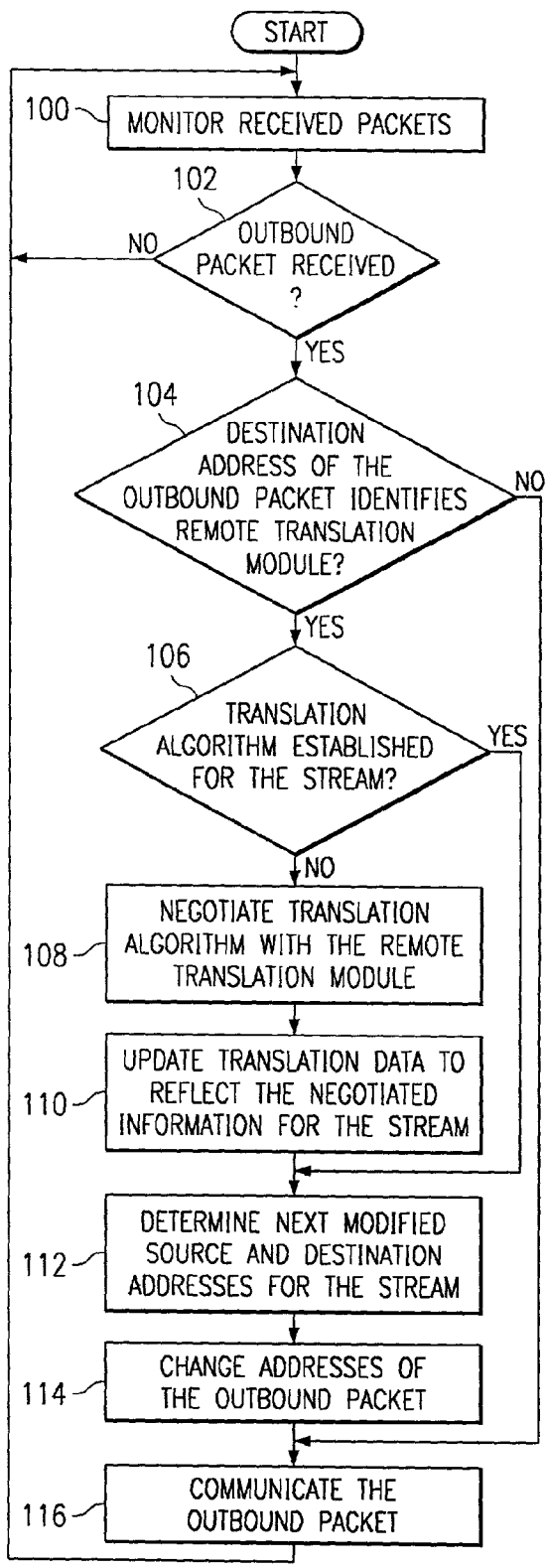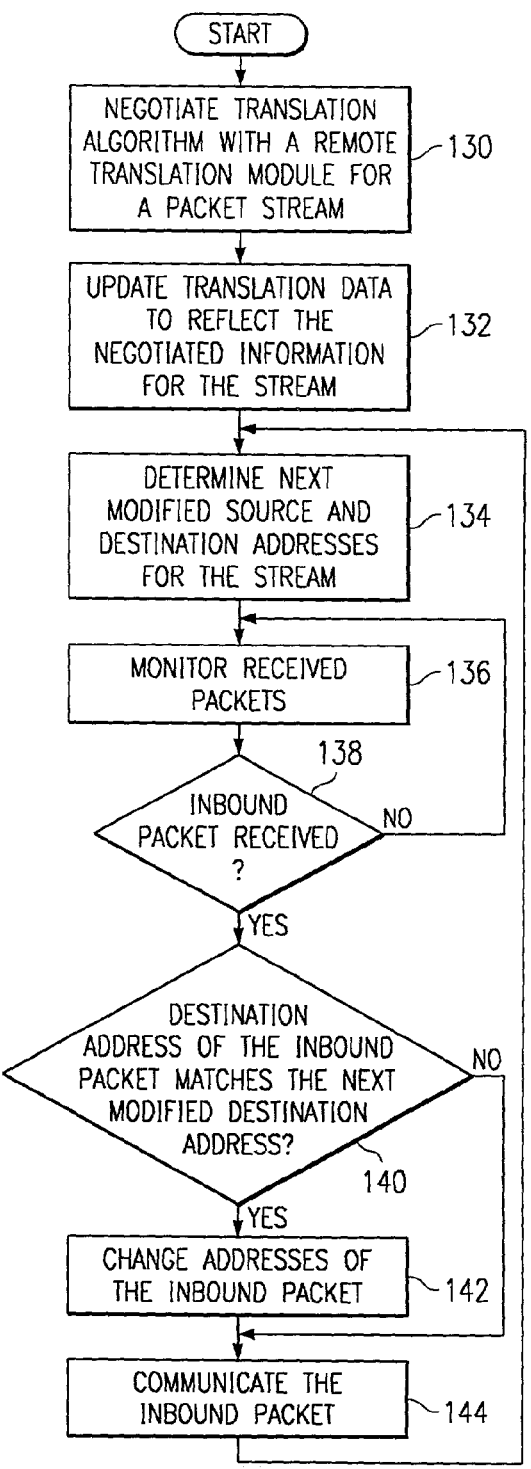

ADDRESS HOPPING OF PACKET-BASED COMMUNICATIONS

TECHNICAL FIELD OF THE INVENTION

The present invention relates generally to packet communication networks and, more particularly, to address hopping of packet-based communications.

BACKGROUND OF THE INVENTION

To overcome many limitations of traditional telephony networks, customers are increasingly turning to packet-based solutions as an alternative. However, while providing many advantages, packet networks may offer less protection against third party interference when compared with other telephony networks. To provide security during packet-based calls, some have proposed and implemented encryption techniques. However, encrypting communications can require relatively large amounts of processing power.

SUMMARY OF THE INVENTION

In accordance with the present invention, techniques for address hopping to secure packet-based communications are provided. According to particular embodiments, the system provides security for packet-based communications by modifying source and destination addresses of packets during a communication session.

According to one embodiment, a method for securing a packet stream receives a stream of packets, with all of the packets having an original destination address and an original source address. For each of the packets in the stream, the method changes the original destination address to a selected one of multiple modified destination addresses, wherein each of the selected modified destination addresses is resolvable by a remote device to the original destination address. More specifically, the method may, for each of the packets in the stream, change the original source address to a selected one of multiple modified source addresses, wherein each of the selected modified source addresses is resolvable by the remote device to the original source address.

Embodiments of the invention provide various technical advantages. These techniques provide for efficient, effective security of packet-based communications and may be implemented with minimal impact to existing systems. During packet-based communications, the shifting source and destination addresses for related packets will severely limit a third party's ability to intercept and interpret communications. Moreover, address hopping schemes provide security to confound eavesdroppers without encryption. This permits the securing of packet-based communications with significantly less processing overhead than is typically required for encryption-based security schemes.

Another advantage is the ability to implement address hopping based security without impacting existing systems. To provide address hopping, translation modules may be inserted between existing elements. These modules process, send and receive packets, modifying addresses for outgoing packets to provide security and resolving addresses of incoming packets to their original source and/or destination addresses. This allows packets passing over potentially unsecure networks to have "secure" addresses, while the end points of the communication session need not have an awareness of the changing of the addresses.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 1 illustrates a communication system that includes translation modules providing address hopping according to particular embodiments of the present invention;

FIG. 2 is a block diagram illustrating components of an exemplary translation module from the system;

FIG. 3 is a flowchart illustrating a method for performing address hopping to secure a packet communication session; and FIG. 4 is a flowchart illustrating a method for receiving and resolving the addresses of packets processed by a translation module.

DETAILED DESCRIPTION OF THE DRAWINGS

FIG. 1 illustrates a communication system, indicated generally at 10, that includes elements supporting packet-based communications and that includes translation modules 12 that provide address hopping to secure packet-based communications. In the embodiment illustrated, system 10 includes both traditional telephony elements and packet-based communications equipment. The traditional telephony elements include telephones 14 and public switched telephone networks (PSTNs) 16, which include central offices 18 and signal transfer points 20. Components supporting packet-based communications include a call agent 22, media gateways 24, packet-enabled telephony devices 26, an internet protocol (IP) network 28, and an IP intranet 30. In general, the elements of system 10 support the establishment of links for communicating information, such as voice and/or data. For communications taking place in whole or in part between packet-based elements, translation modules 12 can provide security using address hopping to obscure source and/or destination addresses of packets.

Telephones 14 represent circuit-switched user interface devices providing connectivity to PSTN 16. For example, telephones 14 may include residential or commercial equipment, such as private branch exchange (PBX) equipment. PSTNs 16 represent portions of circuit-switched networks providing telephony services to users. In the embodiment illustrated, each section of PSTN 16 includes central office 18 and signal transfer point 20. Central offices 18 provide for the management and provisioning of telephony links for users. Thus, telephones 14 link to central offices 18 to receive telephony services. Signal transfer points 20 support the establishment and management of communications links using appropriate signaling. For example, signal transfer points 20 may generate and/or relay signaling system 7 (SS7) messages to and from other elements to establish and control communications. The embodiment illustrated includes two sections of PSTN 16. These two sections represent geographically distinct portions of telephony networks, such as telephony equipment located in two different cities.

To support packet-based communications, system 10 includes a variety of components, including call agent 22, gateways 24, devices 26, network 28, and intranet 30. Call agent 22 represents hardware and/or controlling logic that manages packet-based communication sessions between devices. For example, call agent 22 may handle signaling to set up, control, and tear down packet-based, voice communication sessions between devices 26. In the embodiment illustrated, call agent 22 also supports the establishment of links between packet-based communication devices and circuit-switched communication devices. For example, in response to SS7 messages received from signal transfer point 20, call agent 22 may direct the establishment of packet-based links between gateways 24.

Gateways 24 represent equipment, including controlling logic, linking circuit-switched networks, such as PSTN 16, with packet-based networks, such as network 28. In the embodiment illustrated, gateways 24 couple to central offices 18 and provide for time division multiplexed (TDM) based communications on these links. Gateways 24 also couple to network 28 and provide for packet-based communications on these links. Thus, gateways 24 provide for the establishment of links between circuit-switched and packet-based equipment and interpret communications between these devices. For example, gateway 24 can convert TDM based communications into packets and vice versa.

Network 28 and intranet 30 provide for the transport of packets between various elements of system 10. Thus, network 28 and intranet 30 each represent any suitable collection and arrangement of equipment, such as routers, gateways, and switches, for transporting packets. These packets represent any suitable segments of information delivered using destination addresses included within the packets. According to particular embodiments, intranet 30 includes "secure" equipment that is relatively safe from third party interference, while network 28 represents "unsecured" equipment, such as portions of the Internet, that may be subject to third party interference.

To provide security for packet-based communications, system 10 includes any number of translation modules 12. Each translation module 12 represents any suitable hardware and/or controlling logic that supports address hopping to obscure source and/or destination addresses of communicated packets. Thus, a transmitting translation module 12 may vary the source and destination addresses of packets, and a receiving translation module 12 resolves the modified source and destination addresses of packets into the original source and destination addresses for the packets. Translation modules 12 may perform address hopping routines upon a single packet or a stream of related packets, with the payload of the packets inconsequential to the process. Thus, for example, translation modules 12 may perform address hopping upon signaling packets, voice packets, and/or data packets.

For example, consider a voice telephone call between telephone 14 labeled A (telephone A) and telephone 14 labeled B (telephone B). Upon receiving the dialed digits (for telephone B) from telephone A, central office 18 communicates appropriate connection request messages, such as an initial address message (IAM), through signal transfer point 20 to call agent 22. Call agent 22 analyzes and validates the message and, if valid, communicates set up messages and acknowledgments to appropriate elements. For example, call agent 22 may communicate an initial address message to signal transfer point 20 associated with telephone B, communicate a create connection message (CRCX) to gateway 24 associated with telephone A (gateway A), communicate a corresponding CRCx message to gateway 24 associated with telephone B (gateway B), communicate a request for notification of off hook (RQNT:HU) to gateway B, and communicate an address complete message (ACM) to the original signal transfer point 20 verifying the set up attempt (the ACM message results in telephone A receiving a ringing sound). Upon telephone B going off hook, gateway B notifies call agent 22. In response, call agent 22 communicates a modify connection command (MDCx) to gateway A and gateway B to establish a link between these gateways 24. This establishes a packet-based link between gateway A and gateway B for the communication of voice information between telephone A and telephone B.

Given this example, elements of system 10 exchange both signaling and information packets across network 28. Translation modules 12 may secure some or all of these packets using address hopping. To perform address hopping, a sending translation module 12 modifies the source and/or destination address of a packet to values that may be resolved by a remote translation module 12 to the original source or destination addresses of the packet. For example, consider a signaling message communicated from call agent 22 to gateway A. A packet encoding this message will typically have a source address for call agent 22 and a destination address for gateway A. Upon receiving this packet from call agent 22, translation module C modifies the source and/or destination addresses of the packet and forwards the packet to translation module A. Translation module A receives the modified packet and resolves the original source and destination addresses based upon the modified source and destination addresses. Thus, translation module A modifies the source and destination addresses to indicate call agent 22 as the source and gateway A as the destination.

Similarly, for packets between gateway A and gateway B, translation module A and translation module B may perform similar modifications and resolutions of packet addresses. These modifications obscure the originating and/or destination addresses of packets, with the source and destination equipment unaware of the intermediate process. However, by hopping among any number of available source and/or destination addresses, translation modules 12 can thwart eavesdroppers that focus on particular addresses. For example, consider a stream of voice information received by gateway A and converted into packets for communication to gateway B. Each of these packets will have an original source address, such as an IP address and port associated with telephone A, and a destination address, such as an IP address and port associated with telephone B. To provide address hopping for this stream of packets, translation module 12 may shift between any number of source and/or destination addresses. For example, as often as every consecutive packet, translation module A may select a different source and/or destination address than was used for the previous packet.

To select appropriate source and/or destination addresses during address hopping, translation modules 12 may use any suitable techniques. According to particular embodiments, each translation module 12 has any number of assigned IP addresses. For example, each translation module 12 may have a range of assigned IP addresses. Each assigned IP address may be further distinguished by one of thousands of available ports. For example, according to particular IP protocols, a single IP address may accommodate approximately 64,000 usable ports. Thus, the potential IP address and port combinations available for translation module 12 is vast, even given only a small number of assigned IP addresses.

To select from among the potential addresses, translation modules 12 may use address hopping patterns, pre-assignment of addresses, and/or other suitable address translation techniques. For example, translation module A may modify each consecutive packet within a stream of packets according to a pattern known to both translation module A and translation module B. Thus, translation module B can resolve the addresses of the received packets to their original addresses. Similarly, translation module B may map any number of available addresses to a single destination address. Thus, a received packet addressed to any one of the mapped addresses resolves to the single destination address. However, while particular techniques for selecting among available addresses are disclosed, system 10 contemplates using any suitable patterns, formulas, assignments, and/or other techniques for shifting between available addresses.

Depending on the particular techniques used, translation modules 12 may negotiate translation parameters. For example, upon detecting a request to establish a link between gateway A and gateway B, translation module A may negotiate translation parameters with translation module B. To prevent interference and/or interception of these parameters, translation modules 12 may encrypt the messages sent during negotiation. The negotiated parameters allow each participating translation module 12 to hop between addresses and resolve modified addresses into original source and/or destination addresses. For example, translation module A and translation module B may negotiate a formula or pattern that dictates whether to shift source and/or destination addresses, governs how often to shift these addresses, and permits the determination of each subsequent modified address. Moreover, translation modules 12 may negotiate different translation parameters for hopping of source and destination addresses. For example, translation module A may use a first technique to vary the source address for gateway A while using a second technique to vary the destination address of gateway B.

Thus, as the preceding examples demonstrate, translation modules 12 provide for enhanced security of packet-based communications using address hopping techniques that consume relatively small amounts of processing power in comparison to other security techniques, such as encryption. However, while the embodiment illustrated and the preceding description focus on a particular arrangement of elements that includes separate translation modules 12 providing address hopping, system 10 contemplates incorporating some or all of the features and functionalities of one or more translation modules 12 into any appropriate elements. For example, call agent 22, gateways 24, devices 26, and/or other appropriate elements may provide some or all of the features and functionality of translation modules 12 using any appropriate combination of hardware and/or software. Moreover, while the embodiment illustrated and the examples provided focus on IP based voice communications providing a link between two circuit-switched communications devices, the disclosed techniques are of general applicability to any suitable packet-based communication system.

FIG. 2 is a block diagram illustrating exemplary functional components for translation module 12. In the embodiment illustrated, translation module 12 includes a controller 50, an external interface 52, an internal interface 54, and a memory 56. In general, translation module 12 receives and communicates packets using external interface 52 and internal interface 54 and may translate source and/or destination addresses for these packets to support address hopping.

External interface 52 and internal interface 54 represent any suitable hardware and/or logic providing physical or virtual ports for the receipt and transmission of packets. According to particular embodiments, external interface 52 links to potentially unsecured networks, such as network 28, to permit the transmission and receipt of packets, including packets that have source and/or destination addresses changed to obscure their original source and/or destination addresses. Internal interface 54 couples to secure equipment and/or networks, such as gateways 24, and provides for the transmission and receipt of packets having unmodified source and/or destination addresses.

Controller 50 represents any suitable processors, controllers, and/or logic that provide for the modification of source and/or destination addresses within packets to support address hopping. To support the operation of controller 50, translation module 12 includes memory 56, which maintains inbound translations 58, outbound translations 60, and translation module data 62. Inbound translations 58 includes information for use by translation module 12 in identifying and resolving original source and/or destination addresses based on the source and destination addresses of packets received using external interface 52. For example, for each stream from which packets are expected, inbound translations 58 may include negotiated parameters, state information, and other suitable data for identifying and resolving addresses.

Similarly, outbound translations 60 includes information for use by translation module 12 in modifying original source and/or destination addresses of packets received using internal interface 54. According to particular embodiments, outbound translations 60 maintains negotiated parameters, state information, and other suitable data for any number of communication links.

Translation module data 62 includes information for use during the operation of translation module 12. For example, data 62 may include operating parameters of translation module 12, such as private encryption keys, assigned addresses, and translation schemes. Moreover, data 62 may include information describing other translation modules 12, such as public encryption keys, assigned addresses, translation schemes, and other appropriate information.

In operation, controller 50 monitors packets received using external interface 52 and internal interface 54. For each packet received using external interface 52, controller 50 determines whether the packet has a modified source and/or destination address. For example, controller 50 may compare source and/or destination addresses to state information maintained in inbound translations 58. According to particular embodiments, the state information maintains, for each expected stream, the source and/or destination address expected for the next packet to be received in the stream. Moreover, to accommodate packet loss, the state information may maintain the expected source and/or destination addresses for multiple packets within each stream. Thus, a single lost packet will not disrupt the address hopping process. If the received packet matches one of inbound translations 58, controller 50 performs appropriate processing to resolve the original source and/or destination addresses and modify the packet to its original form.

In addition to monitoring source and destination addresses of packets received using external interface 52, controller 50 may also monitor contents of these packets. For example, for each packet received using external interface 52, controller 50 may examine the contents of the packet to determine whether the packet indicates a new communication stream. For example, controller 50 may detect connection set up messages and, in response, negotiate address hopping schemes with other translation modules 12. Therefore, using external interface 52, controller 50 may also negotiate address hopping schemes with other translation modules 12.

For example, consider a packet communicated from call agent 22 to gateway A requesting gateway A to establish a communication link with gateway B. Translation module A may detect this connection request and, in response, negotiate translation parameters with translation module B. This allows translation module A and translation module B to establish an address hopping scheme in advance of communications between gateway A and gateway B.

During operation, controller 50 also monitors packets received using internal interface 54. Similar to its operation with respect to external interface 52, controller 50 may monitor each received packet to identify packets to be translated, and to identify packets that indicate a potential need for establishing an address hopping scheme with another translation module 12. Upon identifying a packet to be translated, translation module 12 determines appropriate modified source and/or destination addresses for the packet and updates the packet to reflect the modified source and/or destination addresses. For example, translation module 12 may access outbound translations 60 to determine state information and translation algorithms in order to determine appropriate modified source and/or destination addresses. In addition, controller 50 may monitor packets received using internal interface 54 to determine when to establish address hopping for new communication links. For example, upon receiving a packet to a destination address for which address hopping is currently not established, translation module 12 may compare the destination address to translation module data 62 to identify whether address hopping is appropriate for these and other related packets. If so, translation module 12 may negotiate translation parameters and other suitable information with the remote translation module 12.

While the embodiment illustrated and the preceding description focus on a particular embodiment of translation module 12 that includes specific elements, system 10 contemplates translation module 12 having any suitable combination and arrangement of elements providing address hopping for packet-based communications. Thus, the functionalities performed by the particular elements illustrated may be separated or combined as appropriate, and the functionalities of some or all of these elements may be implemented by logic encoded in media. Moreover, as previously discussed, some or all of the functionalities of translation modules 12 may be distributed among other elements of system 10.

FIG. 3 is a flowchart illustrating the operation of translation module 12 in monitoring packets received using internal interface 54 and modifying source and destination addresses for packets. Translation module 12 monitors received packets at step 100 and determines whether an outbound packet has been received at step 102. For example, translation module 12 may monitor packets received from other devices, such as gateway 24, using internal interface 54.

Upon detecting an appropriate packet, translation module 12 determines whether the destination address of the outbound packet identifies a remote translation module 12 at step 104. For example, translation module 12 may compare the destination address to information within outbound translations 60 and/or translation module data 62. If the destination address does not identify a remote translation module 12, translation module 12 communicates the outbound packet using external interface 52 at step 116. However, if the destination address does identify a remote translation module 12, translation module 12 determines whether a translation algorithm has been established for the stream associated with the packet, making this determination at step 106. For example, translation module 12 may access outbound translations 60 to determine whether a translation algorithm has been negotiated with the remote translation module 12 for the communication stream identified by the source and destination addresses of the received packet.

If not, translation module 12 negotiates a translation algorithm with the remote translation module 12 at step 108 and updates translation data maintained within outbound translations 60 to reflect the negotiated information for the stream of packets at step 110.

After determining appropriate parameters for modifying the addresses of the packet, translation module 12 determines the next modified source and destination addresses for the stream at step 112. For example, based upon state information and the current translation algorithm established for the stream, translation module 12 may calculate modified source and destination addresses for the packet. Translation module 12 changes the addresses of the outbound packet at step 114 and communicates the outbound packet at step 116.

Thus, the preceding flowchart illustrates a relatively simple technique for translation module 12 to provide address hopping for one or more packet-based communication streams. However, the preceding flowchart and accompanying description illustrate only an exemplary method of operation, and system 10 contemplates translation module 12 and/or other suitable components using any suitable techniques to provide address hopping. Thus, many of the steps in this flowchart may take place simultaneously and/or in different orders than as shown. In addition, translation module 12 may use methods with additional steps, fewer steps, and/or different steps, so long as the methods remain appropriate.

FIG. 4 is a flowchart illustrating the operation of translation module 12 to establish an address hopping scheme for a communication stream and to process received packets for the stream. Translation module 12 negotiates a translation algorithm with a remote translation module 12 at step 130. For example, through one or more exchanged packets, such as requests and acknowledgments, the two translation modules 12 may negotiate various parameters for use during address hopping for packets associated with the packet stream. Based upon these negotiations, translation module 12 updates translation data to reflect the negotiated information for the stream at step 132. For example, translation module 12 may generate an entry within inbound translations 58 that includes translation parameters, state information, and other suitable data associated with the packet stream.

Using this information, translation module 12 determines the next modified source and destination addresses expected for the stream at step 134. This information allows translation module 12 to identify packets associated with the stream based upon their modified source and/or destination addresses. Moreover, as previously discussed, translation module 12 may determine modified source and destination addresses for several upcoming packets expected within the stream. This permits translation module 12 to identify packets within the stream based upon their modified source and/or destination addresses, regardless of whether the packets arrive out of order or some packets are lost.

Translation module 12 monitors received packets at step 136 and determines whether an inbound packet has been received at step 138. If so, translation module 12 determines whether the destination address of the inbound packet matches the next modified destination address for the packet stream at step 140. If so, translation module 12 changes the addresses of the inbound packet to the original source and destination addresses at step 142 and communicates the inbound packet at step 144. Thus, the preceding description provides an exemplary method of operation for translation module 12 to resolve original source and destination addresses for packets in a communication stream.

However, as with the flowchart illustrated in FIG. 3, the preceding flowchart and accompanying description illustrate only an exemplary method of operation, and system 10 contemplates translation module 12 using any suitable techniques for processing packets to support address hopping. Thus, many of the steps in this flowchart may take place simultaneously and/or in different orders than as shown. For example, while the preceding flowchart illustrates the operation of translation module 12 with respect to a single communication stream, translation module 12 may monitor and process packets for multiple communication streams simultaneously. Therefore, while providing an illustrative method of operation, system 10 contemplates translation module 12 using methods with additional steps, fewer steps, and/or different steps, so long as the methods remain appropriate.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for securing packet-based communications comprising:
   receiving at a first translation module a stream comprising a plurality of packets regarding a communication from a first user interface device intended for a second user interface device, each packet having an original destination address and an original source address; and
   for each of the packets, performing an address modification process including changing the original destination address to a selected one of a plurality of modified destination addresses assigned to a second translation module remote from the first translation module, wherein each of the selected modified destination addresses is resolvable by the second translation module to the original destination address for forwarding the packet to the second user interface device;
   wherein the address modification process is performed independently from both the first user interface device and the second user interface device.

2. The method of claim 1, wherein, except for a first one of the packets, each of the packets is changed to a different one of the modified destination addresses than a preceding one of the packets.

3. The method of claim 1, wherein no more than ten consecutive packets in the stream are changed to an identical one of the modified destination addresses.

4. The method of claim 1, further comprising, for each of the packets, changing the original source address to a selected one of a plurality of modified source addresses, wherein each of the selected modified source addresses is resolvable by the second translation module to the original source address.

5. The method of claim 1, further comprising randomly selecting the modified destination address for the packet from a range of available destination addresses for the second translation module.

6. The method of claim 1, further comprising selecting the modified destination address for the packet from a range of available destination addresses for the second translation module based on a hopping pattern.

7. The method of claim 1, wherein the original destination address comprises an internet protocol address and a port, and the modified destination address for the packet comprises a modified internet protocol address and a modified port.

8. The method of claim 1, wherein the stream comprises an internet protocol based voice communication session.

9. The method of claim 1, further comprising:
   detecting initiation of the stream;
   identifying the second translation module based upon the original destination address; and
   negotiating translation parameters for the stream with the second translation module, the translation parameters comprising an algorithm dictating how to select from among the modified destination addresses.

10. A method for securing packet-based communications comprising:
    negotiating translation parameters with a remote device for a communication stream between a first user interface device and a second user interface device, the translation parameters comprising an original destination address, a plurality of available destination addresses, and an algorithm;
    determining a modified destination address from among the available destination addresses according to the algorithm;
    receiving a packet of the communication stream having the modified destination address; and
    changing the packet to have the original destination address, wherein the address change is performed independently from both the first user interface device and the second user interface device.

11. The method of claim 10, wherein:
    the translation parameters further comprise an original source address and a plurality of available source addresses; and further comprising:
    determining a modified source address from among the available source addresses according to the algorithm.

12. The method of claim 11, the packet further having the modified source address, the method further comprising changing the packet to have the original source address.

13. The method of claim 10, wherein the algorithm comprises a hopping pattern that dictates how to select from among the available destination addresses.

14. A first translation module comprising:
    a first interface of the first translation module operable to receive a stream comprising a plurality of packets regarding a communication from a first user interface device intended for a second user interface device, each packet having an original destination address and an original source address;
    a controller of the first translation module operable, for each of the packets, to perform an address modification process including changing the original destination address to a selected one of a plurality of modified destination addresses assigned to a second translation module remote from the first translation module, wherein each of the selected modified destination addresses is resolvable by the second translation module to the original destination address, wherein the address modification process is performed independently from both the first user interface device and the second user interface device; and
    a second interface operable to transmit the changed packets for receipt by the remote device.

15. The translation module claim 14, wherein, except for a first one of the packets, each of the packets is changed to a different one of the modified destination addresses than a preceding one of the packets.

16. The translation module claim 14, wherein the controller is further operable, for each of the packets, to change the original source address to a selected one of a plurality of modified source addresses, wherein each of the selected modified source addresses is resolvable by the second translation module to the original source address.

17. The translation module claim 14, wherein the controller is further operable to select the modified destination address for the packet from a range of available destination addresses for the second translation module based on a hopping pattern.

18. The translation module claim 14, wherein the original destination address comprises an internet protocol address and a port, and the modified destination address for the packet comprises a modified internet protocol address and a modified port.

19. The translation module claim 14, wherein the controller is further operable to:
detect initiation of the stream;
identify the second translation module based upon the original destination address; and
negotiate translation parameters for the stream with the second translation module, the translation parameters comprising an algorithm dictating how to select from among the modified destination addresses.

20. Logic for securing packet-based communications, the logic encoded in a medium and executed to:
receive at a first translation module a stream comprising a plurality of packets regarding a communication from a first user interface device intended for a second user interface device, each packet having an original destination address and an original source address; and
for each of the packets, perform an address modification process including changing the original destination address to a selected one of a plurality of modified destination addresses assigned to a second translation module remote from the first translation module, wherein each of the selected modified destination addresses is resolvable by the second translation module to the original destination address, wherein the address modification process is performed independently from both the first user interface device and the second user interface device.

21. The logic of claim 20, wherein, except for a first one of the packets, each of the packets is changed to a different one of the modified destination addresses than a preceding one of the packets.

22. The logic of claim 20, further operable, for each of the packets, to change the original source address to a selected one of a plurality of modified source addresses, wherein each of the selected modified source addresses is resolvable by the second translation module to the original source address.

23. The logic of claim 20, further operable to select the modified destination address for the packet from a range of available destination addresses for the second translation module based on a hopping pattern.

24. The logic of claim 20, wherein the original destination address comprises an internet protocol address and a port, and the modified destination address for the packet comprises a modified internet protocol address and a modified port.

25. The logic of claim 20, further operable to:
detect initiation of the stream;
identify the second translation module based upon the original destination address; and
negotiate translation parameters for the stream with the second translation module, the translation parameters comprising an algorithm dictating how to select from among the modified destination addresses.

26. A first translation module comprising:
means for receiving at the first translation module a stream comprising a plurality of packets regarding a communication from a first user interface device intended for a second user interface device, each packet having an original destination address and an original source address; and
means for performing at the first translation module an address modification process including, for each of the packets, changing the original destination address to a selected one of a plurality of modified destination addresses assigned to a second translation module remote from the first translation module, wherein each of the selected modified destination addresses is resolvable by the second translation module to the original destination address for forwarding the packet to the second user interface device;
wherein the address modification process is performed independently from both the first user interface device and the second user interface device.

27. A method for securing packet-based communications comprising:
detecting initiation of a communication stream at a first translation module, the communication stream comprising a plurality of packets from a first user interface device intended for a second user interface device, each packet having an original destination address and an original source address;
identifying a second translation module remote from the first translation module based upon the original destination address;
negotiating translation parameters for the communication stream with the second translation module, the translation parameters comprising an algorithm dictating how to select from among a plurality of modified destination addresses;
receiving the packets; and
for each of the packets, performing an address modification process including selecting one of the modified destination addresses according to the algorithm and changing the original destination address to the selected modified destination address, wherein each of the selected modified destination addresses is resolvable by the second translation module to the original destination address, wherein, except for a first one of the packets, each of the packets is changed to a different one of the modified destination addresses than a preceding one of the packets, and wherein the address modification process is performed independently from both the first user interface device and the second user interface device.

* * * * *